US006823418B2

(12) United States Patent
Langendorf et al.

(10) Patent No.: US 6,823,418 B2
(45) Date of Patent: Nov. 23, 2004

(54) VIRTUAL PCI DEVICE APPARATUS AND METHOD

(75) Inventors: Brian K. Langendorf, Benicia, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 09/896,395

(22) Filed: Jun. 29, 2001

(65) Prior Publication Data

US 2003/0005207 A1 Jan. 2, 2003

(51) Int. Cl.$^7$ .............................................. G06F 13/00
(52) U.S. Cl. ...................................... 710/306; 719/324
(58) Field of Search .......................... 703/20, 24, 25, 703/28; 710/306, 312; 718/1; 719/324; 370/402

(56) References Cited

U.S. PATENT DOCUMENTS

| | | | | | |
|---|---|---|---|---|---|
| 5,526,503 | A | * | 6/1996 | Kim | 711/203 |
| 5,659,551 | A | * | 8/1997 | Huott et al. | 714/725 |
| 5,751,975 | A | * | 5/1998 | Gillespie et al. | 710/315 |
| 5,796,984 | A | * | 8/1998 | Pearce et al. | 703/24 |
| 5,832,246 | A | * | 11/1998 | Matsumoto | 710/308 |
| 5,930,827 | A | * | 7/1999 | Sturges | 711/170 |
| 5,968,139 | A | * | 10/1999 | Klein | 710/10 |
| 6,108,719 | A | | 8/2000 | Klein | |
| 6,185,630 | B1 | * | 2/2001 | Simmons | 710/10 |
| 6,366,877 | B1 | * | 4/2002 | Nishino et al. | 703/25 |
| 6,516,375 | B1 | * | 2/2003 | Ajanovic et al. | 710/305 |
| 6,629,157 | B1 | * | 9/2003 | Falardeau et al. | 710/10 |
| 2002/0073264 | A1 | * | 6/2002 | Geroge et al. | 710/305 |
| 2002/0073296 | A1 | * | 6/2002 | Buch et al. | 711/202 |
| 2003/0097509 | A1 | * | 5/2003 | Fry et al. | 710/305 |

OTHER PUBLICATIONS

PCI System Architecture, 1995, pp. 20–25, 32, 301–302, 312–313, 384, 386–387, 438, 475, 489.*
Intel 440BX AGPset: 82443BV Host Bridge/Controller specification update Apr. 1999.*
Intel 440BX AGPset: 82443BV Host Bridge/Controller Datasheet Apr. 1998.*
International Preliminary Examination Report, mailed Oct. 29, 2003, pp. 1 total.
Intel 460GX Chipset Datasheet, document number 248703–001, Jun. 2001, pp. 1–1–12–14.
Intel 430TX PCISET: 82439TX System Controller (MTXC), Feb. 1997, pp. 1–83.

* cited by examiner

Primary Examiner—Paul R. Myers
(74) Attorney, Agent, or Firm—Blakely, Sokoloff, Taylor & Zafman LLP

(57) ABSTRACT

Virtual PCI bus appears from the perspective of a computer program to be a part of a physical hierarchical PCI bus structure residing behind a host-to-PCI bridge. Devices that are physically located on the host bus side of the host-to-PCI bridge may appear as virtual devices residing on the virtual PCI bus allowing the physical devices to participate in device independent initialization and system resource allocation generally available only to PCI compliant devices. Processor initiated host bus cycles targeted to the virtual PCI device may be intercepted and redirected to the physical device.

30 Claims, 8 Drawing Sheets

VIRTUAL PCI DEVICE APPARATUS AND METHOD

BACKGROUND OF THE INVENTION

1. Field of the Invention

The invention pertains generally to computers. In particular, it pertains to data transfer busses.

2. Description of the Related Art

The PCI Local Bus Specification Rev. 2.2 and PCI to PCI Bridge Architecture Specification Rev. 1.1, both published by the PCI Special Interest Group, proscribe a PCI (Peripheral Component Interconnect) bus protocol for integrating network controllers, mass storage controllers, display controllers, multimedia device, communication device, and other devices into a system. PCI bus protocol, which includes specifications for electrical characteristics as well as the manner in which software interacts with PCI devices, provides for the integration of peripheral devices in a manner that is generally independent from the particular protocol employed by other system components such as a host bus, processor, or memory.

PCI protocol provides "hooks" to enable computer programs to directly access and configure PCI devices. These hooks include configuration address space for accessing 256 8-bit configuration registers associated with each PCI device to allow computer programs to optionally detect each PCI device installed in a system, identify the vendor and device type, determine each PCI device's system resource requirements, relocate each device within the system address space, interrupt binding, install, configure, boot without user intervention and for system address map construction. Configuration registers include a predefined header region and device dependent region; however, only the necessary and relevant registers in each region need be implemented. PCI-to-PCI bridges are PCI devices with configuration registers, which are accessible to a computer program to assign a range bus number to the PCI busses behind the PCI-to-PCI bridge.

Configuration space is accessed through configuration cycles initiated by a computer program executing on a host processor. PCI protocol anticipates that the routing of configuration cycles be accomplished through either one of two distinct mechanisms in which a host-to-PCI bridge translates a software command (in the form of a sequence of processor initiated host bus accesses to I/O space) into a single configuration cycle on the targeted PCI bus involving the assertion of a particular PCI bus signal that is received by the targeted PCI device to indicate to that device that it is the target for the current configuration cycle.

Detection and initialization of PCI devices in a system can be accomplished by device independent program by utilizing configuration space. A program may poll the configuration space allocated to each slot on PCI bus 0 to detect the presence of PCI devices and PCI-to-PCI bridges that reside on bus 0. The program may assign each detected PCI-to-PCI bridge a unique bus number by writing to particular configuration registers and then poll each slot on each assigned bus to detect the presence of PCI devices and PCI-to-PCI bridges. This process may be continued until each slot on each detected PCI bus is polled and all PCI devices are detected. For each PCI device found installed in the system, the device's configuration registers may be read to determine its resource requirements. A system address map may be built to eliminate conflicts among the system and various PCI devices and system resources may be assigned to each PCI device by writing to the appropriate configuration registers in each PCI device. Additionally, a self-test may be invoked on those devices that support self-test and any other initialization, installation, and configuration may be accomplished for each PCI device with or without user intervention.

Disadvantages imposed by strict adherence to PCI protocol include limits on data transfer speed, data path width, latency, and bandwidth, which set an upper boundary for performance of PCI devices. Performance may also be restricted by delays inherent to host-to-PCI bridges as well as the bandwidth constraints inherent to multiple PCI devices residing on a shared PCI bus. The present trend is for increasingly higher performance processors, memory, and host busses in which efficiently coupled devices can achieve performance advantages such as lower latency, higher throughput, and increased overall system performance than can be achieved through coupling to an actual PCI bus.

Plug-and-Play™ resource allocation programs, as required by PCI bridge specifications, typically expect the address space allocated to a particular PCI bus to include the address space allocated to any PCI bus behind that particular PCI bus. Accordingly, full compliance with PCI protocol increases the difficulty of locating PCI devices on the host processor side of a host-to-PCI bridge, where the PCI devices—possibly for compatibility reasons—require an address space that may be a subset of the address space allocated to a physical PCI bus.

DETAILED DESCRIPTION

Figure 1A:
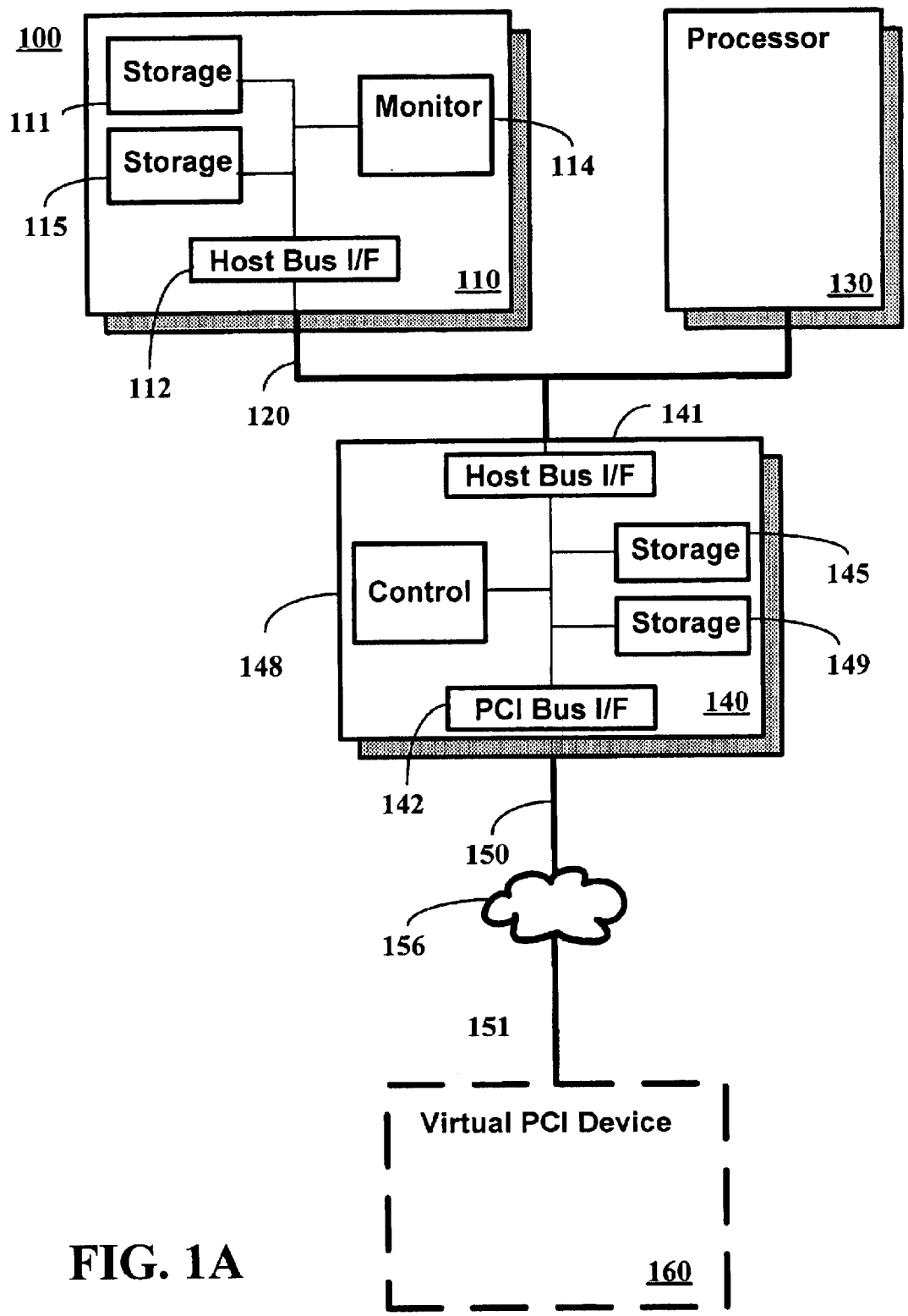
FIGS. 1A, 1B show a system configuration in accordance with the present invention.

Various embodiments of the provide for the integration of devices, such as network controllers, mass storage controllers, display controllers, multimedia devices, communication devices, and other devices, into a host bus processor as well as the efficient coupling of a device to a processor host bus. Select aspects of PCI protocol may be adhered to, enabling software support for these devices that is generally available only to PCI compliant devices. The present invention may provide, in some systems, at least one of a number of advantages over methods of prior art including: increased system performance, increased device performance, simpler initialization and configuration of all devices in a system, increased robustness in the system resource allocation process, lower overall cost and decreased physical board/chip space as well as enabling the allocation of a subset of the address space assigned to a physical PCI bus to a device residing on a host bus. Additionally, the present invention may enable integration of devices, which appear to computer programs as having many of the characteristics of a PCI compliant device, into a host processor, resulting in a number of advantages such as lower overall system cost, less space, reduction in processor-chip pin-count and increased bandwidth on PCI busses, increased system performance or increased device performance.

FIGS. 1A, 1B, 2, 3 and 4 show block diagrams of systems 100, 200, 300 and 400 for explaining various embodiments of the present invention. Processor 130 may represent any one processor coupled to host bus 120. Alternatively processor 130 may represent two or more processors coupled to host bus 120.

Systems 100, 200, 300, 400 may include a host bus device 110, 210, 410 such as a network controller, mass storage controller, display controller, multimedia device, communication device, or other device. Host bus device 110, 210, 410 may be coupled to host bus 120 through an interface 112 in a manner that allows host bus 120 to be monitored and allows processor initiated host bus cycles, which are targeted to non-existent virtual PCI device 160, to be intercepted by host bus device 110.

Host bus device 110, 210, 410 may include a monitor circuit 114 that is coupled to host bus 120 for tracking host bus cycles. Monitor circuit 114 may capture select information during each host bus cycle and identifies select host bus cycles that are to be snooped or intercepted. Read cycles may be intercepted by driving select host bus data signals to transfer data to host bus 120 and then completing the cycle. A cycle, initiated by processor 130, is completed by informing the active processor 130 when to terminate the cycle pursuant to the particular protocol employed by the host bus 120. Write cycles may be intercepted by latching the value of select host bus 120 data signals on host bus 120 write cycles and then completing the cycle. Host bus 120 cycles may be snooped by reading and storing select host bus cycle information in a storage 115 while the cycle is typically completed by another device coupled to the host bus 120.

Host bus device 110, 210, 410 may include storage 111 that is coupled to host bus 120 to allow the contents of storage 111 to be accessed through the host bus 120. Various specific embodiments of storage 111 may include registers 216, 218, 417 that reside in system configuration space or random access memory (RAM), registers, or data ports that reside in system I/O or memory address space.

PCI protocol provides for a certain number of addressable slots on each PCI bus in which a PCI device may reside. A PCI-to-PCI bridge is a PCI device that provides a transfer path between two PCI busses. A computer program typically assigns each PCI bus directly behind a detected PCI-to-PCI bridge a unique bus number. The PCI bus number and slot number combination provide a unique identifier that may be used by computer programs to select any particular PCI device installed in a system through configuration space. PCI addressing and routing protocol generally anticipates a physical hierarchal bus structure in which host bus cycles, targeted to a particular PCI device are physically routed through a host-to-PCI bridge and possibly through one or more PCI-to-PCI bridges to generate a cycle on the particular PCI bus in which the targeted PCI device resides. Each PCI bus is defined to be behind any PCI bus in the physical/virtual data transfer path between that PCI bus and host bus.

For purposes of this specification a primary PCI bus 150 may be bus number 0 and be the bus directly behind the host-to-PCI bridge, but it may also be any PCI bus that is behind bus number 0 in which virtual PCI device 160 appears to be behind and it is consistent with the methods of the present inventions for there to be more then one primary PCI bus in a particular system. Additionally the primary PCI bus 150 may be an actual PCI bus or it may be virtual. The terms virtual and logical, for purposes of this specification, refer to the perspective of a computer program running on any one or more processor 130 where the program has an impression of a physical device or structure that may not be reflective of an actual physical device or structure. Virtual PCI device 160 logically resides on a PCI bus 151, which is either an extension of primary PCI bus 150 or one of its subordinates 156 (i.e. busses that reside behind primary PCI bus 150).

A host-to-PCI bridge 140, 240, 340 may facilitate the translation and routing of a select host bus 120 cycles to a primary PCI bus 150 and its subordinate busses. Host-to-PCI bridge 140, 240, 340 may include, a host bus interface 141, a PCI bus interface 142, storage 145, storage 149 and control circuit 148 to track host bus 120 cycles to determine, for each host bus cycle, whether to route the host bus cycle to an actual primary PCI bus 150. To make this determination, control circuit 148 consults storage 145, which identifies address space allocated to primary PCI bus 150 and its subordinates, and storage 149, which identifies address space allocated to virtual PCI device 160 or possibly other virtual devices. Storage 145 and 149 may hold information in the form of bus numbers, memory address ranges, I/O address ranges or other similar information. The information in storage 149, that indicates the address ranges allocated to virtual PCI device 160 (or in more complex configurations to all or a group of virtual devices or busses), may generally be a subset of the address space in storage 145, which is allocated to primary PCI bus 150 and its subordinates. Host bus cycles which are targeted to virtual PCI device 160 are allowed to be intercepted by host bus device 110, 210, 310.

In a system where host bus 120 utilizes the protocol of a Pentium™ 3 or 4 processor, host-to-PCI bridge 140, 240, 340 may be the responder for all host bus cycles insuring that all host bus cycles are completed according to host bus protocol, and host bus device 110 may claim select host bus cycles which it intercepts.

The information required to identify host bus cycles targeted to virtual PCI device 160 and the manner in which this information is obtained, may depend on the bus structure of the particular system. The unique bus-device number combination of virtual PCI device 160 may be hardwired or preprogrammed into both the host bus device 110 and host-to-PCI bridge in a system 100 in which virtual PCI device 160 resides logically on primary PCI bus 150.

It is consistent with the methods of the present invention for a system 100, 200, 300, 400 to have two, three or more host bus devices 110, 210, 410 or to have two, three or more processors 130 with each having one or more host bus devices 110, 210, 410 integrated into it. The methods of the present invention may be applied to a system 100 comprised of a plurality of distinct host bus devices 110, which are each to be associated with one of a plurality of distinct virtual PCI devices 160. Host bus 120 cycles targeted to any one of the plurality of virtual PCI devices 160 are not forwarded to primary PCI bus 150 by host-to-PCI bridge 140; rather, one of the host bus devices 110 is allowed to intercept the cycle. More than one host bus device 110 may be associated with a particular virtual PCI device 160, such that the two or more host bus devices 110 utilize the system resources allocated to the particular virtual PCI device. Conversely, a single host bus device 110 may be associated with more than one virtual PCI device 160. In addition, a host bus device 110 may support multiple functions in accordance with PCI protocol. A scheme for preventing multiple host bus devices 110 from intercepting cycles to the same virtual PCI device 160, may be accomplished by hardwiring or preprogramming each host bus device 110 with a unique bus number-device number combination for identifying its associated virtual PCI device 160.

Figure 1B:
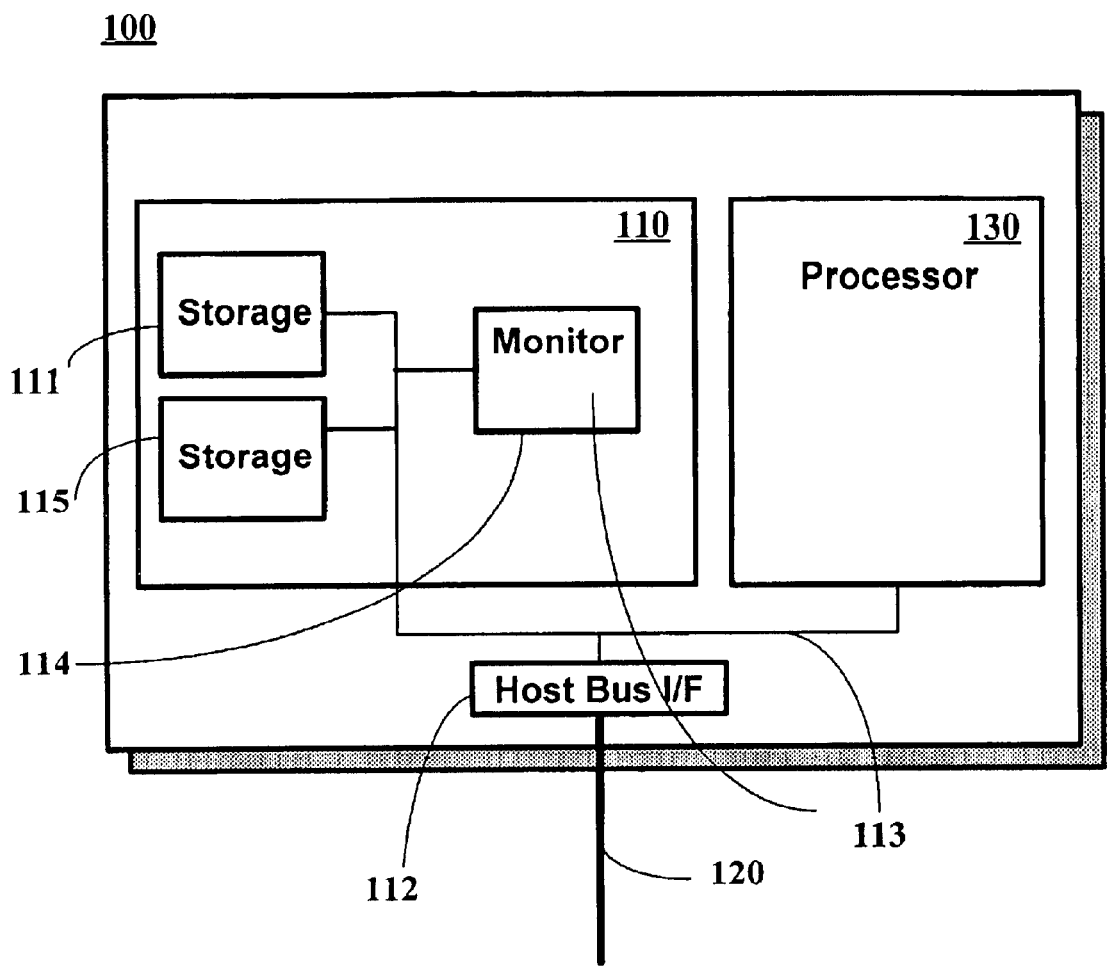

FIG. 1A shows host bus device 110 coupled to host bus through interface 112, which is distinct from the host bus interface to processor 130. FIG. 1B shows an alternate configuration consistent with the methods of the present invention, where processor 130 and host bus device 110 are coupled to host bus 120 through an internal bus 113 and a shared host bus interface 112. The system of FIG. 1B can result from integrating host bus device 110 and processor 130 into a single circuit package.

Figure 2:
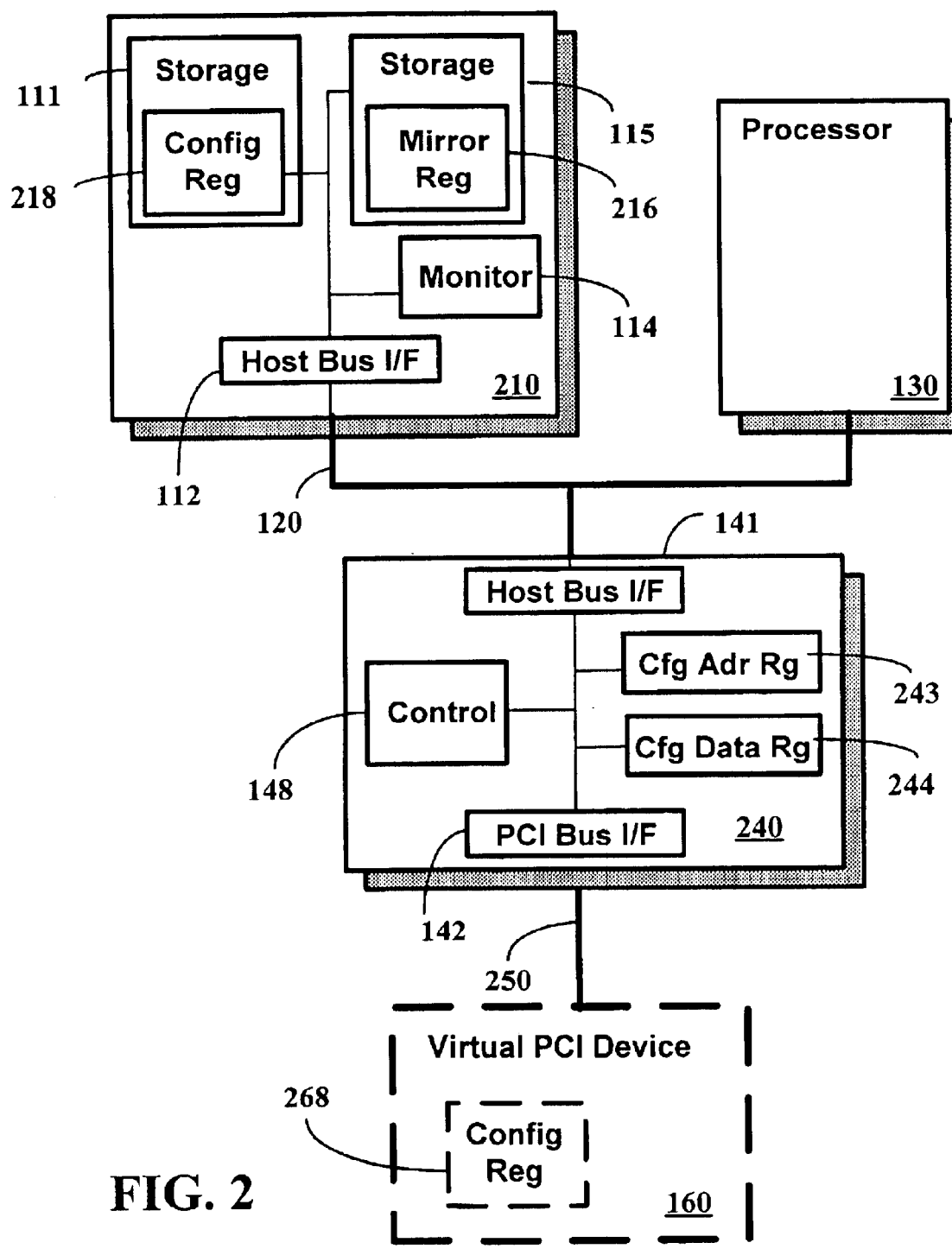
FIG. 2 shows a more detailed system configuration.

FIG. 2 shows a system 200 for explaining an embodiment of the present invention pursuant to the teachings for system 100 shown in FIG. 1. System 200 includes a virtual PCI device 160, which appears from the perspective of a computer program running on one or more processors 130, to include 256 8-bit configuration registers 268 that are accessible through configuration space. Only the necessary and relevant configuration registers 268 appear to be implemented. In accordance with PCI protocol, a computer program may initiate accesses to virtual configuration registers 268 to accomplish one or more functions that include detecting the presence of virtual PCI device 160, identifying the vendor and device type determining virtual device's 160 system resource requirements, providing for full device relocation, interrupt binding, installation, configuration, booting without user intervention, and including virtual PCI device in the system map construction.

Host bus device 210 may include host bus storage 111, which in this embodiment, is comprised of PCI compliant configuration registers 218. Only the necessary and relevant registers 218 are implemented. Monitor circuit 114 tracks host bus cycles and identifies host bus cycles targeted to virtual configuration registers 268, which are intercepted and redirected to access the host bus device configuration registers 218. As a result, a computer program executing on processor 130 can access host bus device configuration registers 218 by initiating a host bus cycle targeted for the configuration registers 268 of virtual PCI device 160. In this manner, host bus device 210 participates in an initialization and configuration procedure for assigning system resources that is generally available only to PCI devices.

Configuration cycles are generated in system 200 through either one of two mapping mechanisms provided by PCI protocol. Mechanism one is an indexing scheme in which two fixed locations in processor I/O space are reserved for a configuration-address register 243 and a configuration-data register 244, which are typically incorporated into a host-to-PCI bridge 240. Configuration-address register 243 enables or disables configuration space and is written by a computer program to identify a particular PCI device and specific configuration register by specifying the bus number, device number, function number, and register number for which a subsequent configuration cycle is intended. Subsequent DWORD read and write host bus cycles targeted to configuration-data register 244 are translated and routed, typically by host-to-PCI bridge 240, into PCI compliant configuration cycles; however, host bus cycles targeted to the configuration registers 268 of virtual PCI device 160 are intercepted by host bus device 210 rather then be routed by host-to-PCI bridge 240 as anticipated by PCI protocol.

A system 200 that supports mechanism one, may provide a mirror register 216 that is included in storage 115, which holds select information obtained through snooping. Host bus 120 write cycles targeted to configuration-address register 243 may be snooped by host bus device 210 and the data transferred in the snooped cycle may be stored in mirror register 216 which then reflects the contents of configuration-address register 243. Monitor circuit 114 may consult mirror register 216 to identify subsequent DWORD host bus 120 cycles targeted to configuration-data register 244 that are intended to access virtual configuration registers 268. These identified cycles may be intercepted by host bus device 210 and redirected to access corresponding configuration registers 218 in host bus device 210.

Alternately, system 200 may support mechanism two, where a configuration-space-enable register (not shown) and a forward register (not shown), which typically reside in host-to-PCI bridge 240, are written to by a computer program to specify 4k byte of configuration space to be mapped into a fixed location in processor I/O address space. A system 200, designed to supports mechanism two may provide a mirror register 216 to store snooped host bus write cycles targeted to configuration-space-enable register (not shown) and forward register (not shown). Mirror register 216 may be consulted by monitor circuit 114 to identify host bus cycles that are targeted to virtual device's configuration registers 268. Identified cycles may be intercepted by host bus device 210 and redirected to access corresponding configuration registers 218 in host bus device 210.

Pursuant to PCI protocol, configuration registers may be utilized by a computer program to allocate system resources that include interrupts, processor memory address space, processor I/O address space, and ROM (read only memory) address space which is a range of processor memory address space reserved for ROMs. A computer program may initiate accesses to non-existent virtual configuration registers 268 to determine virtual PCI device's 160 system requirements and allocate resources to virtual PCI device 160 by writing to select configuration registers 268. A computer program may also access virtual device's configuration registers 268 for handling catastrophic errors as well as executing and obtaining status of a built in self-test (BIST).

Optionally, host bus device configuration registers 218 may be implemented to indicate a request for specific system resources such as one or more ranges of memory space or I/O space to be assigned to virtual PCI device 260. A portion of internal storage 111 may be mapped by a computer program into this address space for access through the host bus 120. After a computer program assigns address space to virtual PCI device 160, monitor circuit 114, in this optional embodiment, may consult the appropriate configuration registers 218 to identify whether a host bus cycle is targeted to memory or I/O space allocated to virtual PCI device 160. These identified cycles may be intercepted by host bus device 210 and redirected to access host bus storage 111.

Both the host bus device 210 and host-to-PCI bridge 240 may be aware of the bus number and device number of virtual PCI device 160. This information may be hardwired, preprogrammed, or provided by a program during system initialization and is used to identify host bus cycles targeted to virtual PCI device 160 configuration space. Host-to-PCI bridge 240 may learn the address space allocated to virtual PCI device 160 by snooping select host bus write cycles targeted to the particular virtual configuration registers 268 which specify the address space allocated to virtual PCI device 160.

Figure 3:
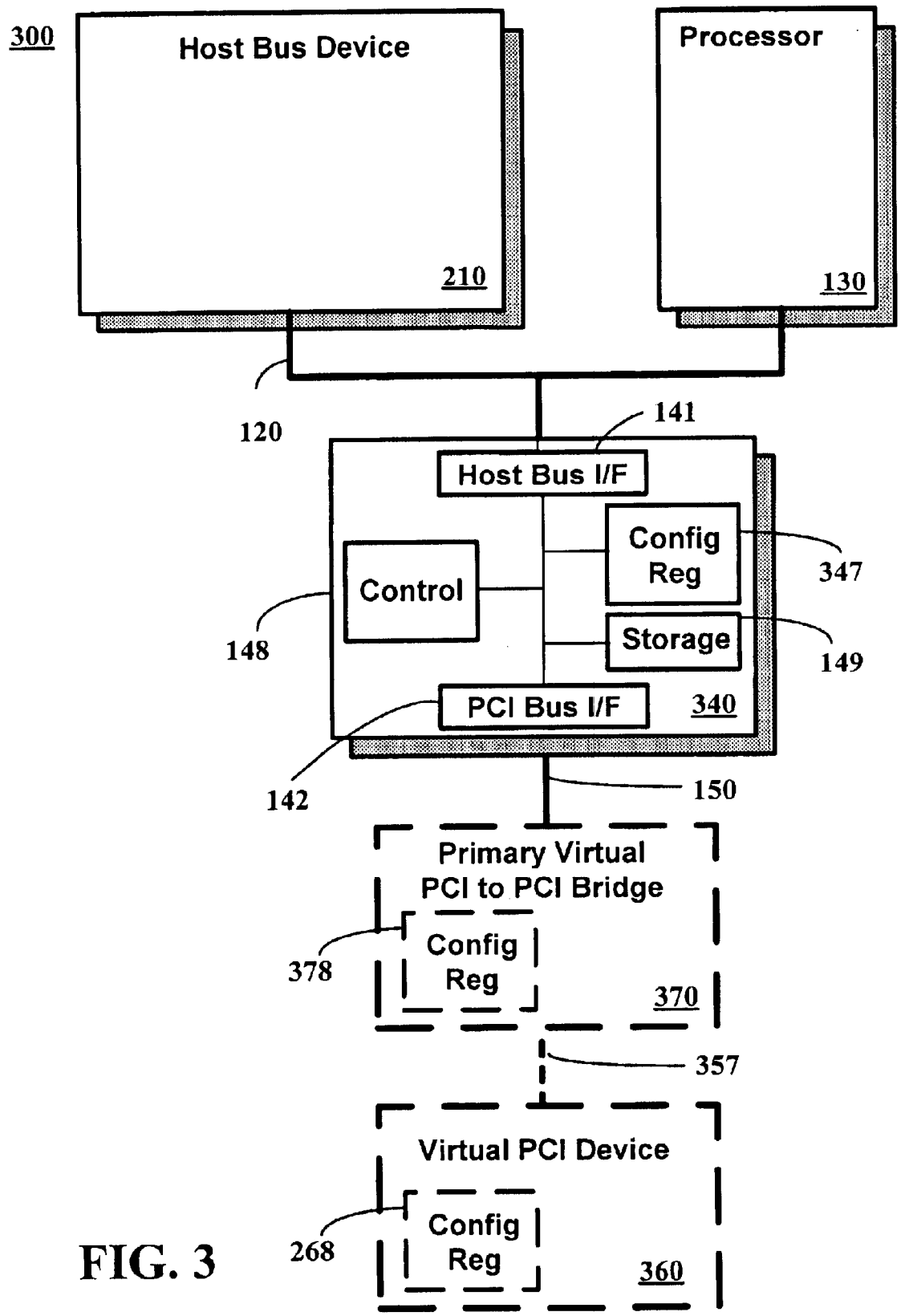
FIG. 3 shows a system with a primary virtual bridge.

FIG. 3 shows a system 300, for explaining an embodiment of the present invention, pursuant to the teachings for system 100 and system 200. System 300 implements mechanism one for accessing configuration space. System 300 may be comprised of a primary virtual PCI-to-PCI (P—P) bridge 370 that may appear, to a computer program running on a processor 130, as residing on primary PCI bus 150 and may appear as a bridge to primary virtual PCI bus 357. Virtual PCI device 360 may appear, to a computer program running on processor 130 as residing on primary virtual bus 357.

Both the host bus device 210 and host-to-PCI bridge 340, in this embodiment, are aware of the bus number and device number in which primary virtual P—P bridge 370 resides and host bus device 210 is aware of the device number of virtual PCI device 360. This information may be provided by an initialization program or be hardwired or preprogrammed.

Host-to-PCI bridge 340 may include storage 149, which in this embodiment is written by a computer program, such as a Plug-and-Play™ resource allocation program, to assign address space to primary PCI bus 150, which encompasses all address space assigned to virtual device 160. Information stored in storage 149 may include the bus numbers of virtual busses (not shown) that may reside behind primary PCI bus 357: bus numbers are commonly sufficient information to determine the configuration space allocated to primary PCI bus 357 and its subordinates. Optionally, storage 149 may include the memory space or I/O space allocated to primary PCI bus 357 and any subordinates. In this embodiment, pursuant to Plug-and-Play™ protocol, the address space allocated to primary PCI bus 357 typically encompasses the address space allocated to any optional subordinate busses (not shown) and virtual PCI device 160 resulting in easy and efficient decode by host-to-PCI bridge 340 for identifying host bus cycles targeted to virtual PCI bus 357 and any optional subordinate virtual busses.

Host-to-PCI bridge 340 may include bridge configuration registers 347 that are consulted by control circuit 148 to identify host bus cycles targeted to the virtual configuration registers 378 of primary virtual P—P bridge 370 and to route these identified cycles to the Host-to-PCI bridge configuration registers 347. Control circuit 148, in this embodiment, may consult both the bridge configuration registers 347 and storage 145 and storage 149 to determine whether to route host bus cycles to primary PCI bus 150.

Host bus device 210 may snoop host bus cycles targeted to the configuration registers 378 of primary virtual P—P bridge 370, to learn the bus number assigned by a computer program to primary virtual PCI bus 357 and store this information in storage 115, which holds select information obtained through snooping. Systems having only one host bus device 210 may arbitrarily assign a device number to virtual PCI device 160. Systems with multiple host bus devices 210 may require a mechanism for associating each host bus device 210 with a distinct virtual PCI device 360, such as providing each with a unique device number (i.e. slot number), which may be hardwired, preprogrammed, or stored by an initialization program.

Figure 4:
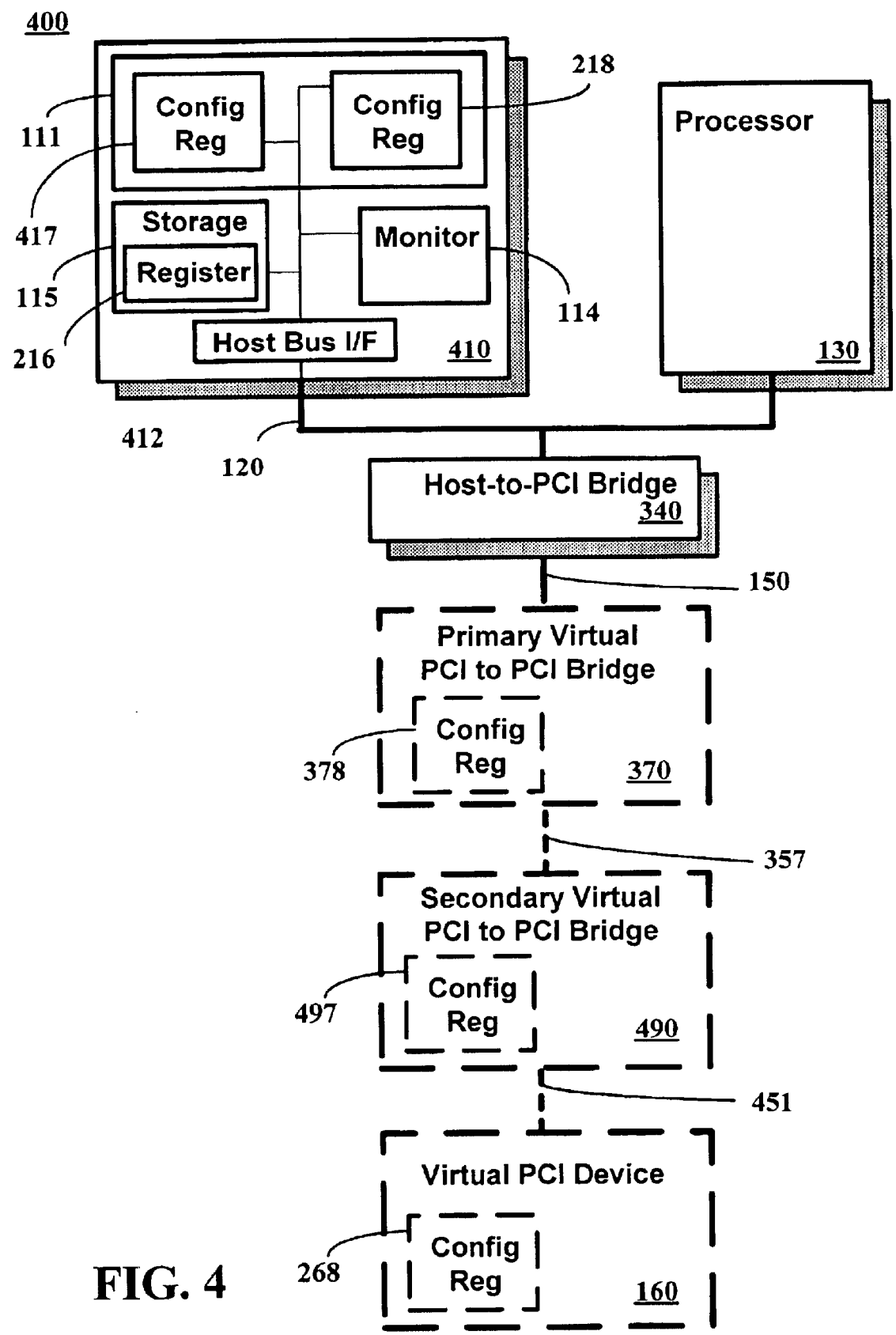
FIG. 4 shows a system with a secondary virtual bridge and a primary virtual bridge.

FIG. 4 shows a system 400 for explaining an embodiment of the present invention, pursuant to the teachings for system 300 shown in FIG. 3. Host bus device 410 may conform to the description given for host bus device 210 and 310. System 400 implements mechanism one for accessing configuration space. System 400 is further comprised of a secondary virtual P—P bridge 490, which directly interfaces a secondary virtual PCI bus 451. Secondary virtual P—P bridge 490, may appear from the perspective of a computer program running on a processor 130, as residing on primary virtual PCI bus 357 and virtual PCI device 160 may reside logically on secondary virtual PCI bus 451.

The secondary virtual bus 451 is subordinate to primary virtual PCI bus 357, and, in this embodiment, the address space allocated to secondary virtual bus 451 and virtual PCI device 160 are within the address space allocated to the primary virtual PCI bus 357. Host-to-PCI bridge 340 may consult storage 145 to identify and route host bus cycles targeted for primary PCI bus 150 and its subordinates, and consult storage 149 to identify host bus cycles that are targeted to primary virtual bus 357 and its subordinates. Host bus cycles targeted to primary virtual bus 357 and its subordinates are not forwarded to primary PCI bus 450 but are allowed to be intercepted by a host bus device 410. Host-to-PCI bridge 340 may complete (i.e. terminate) intercepted host bus 430 cycles according to host bus protocol.

Host bus device 410 may include storage 111, which is coupled to the host bus and accessible by processor 130. Storage 111 may be comprised of device configuration registers 218, which are accessed by host bus cycles targeted to the configuration registers 268 of virtual PCI device 160. In addition, storage 111 may be further comprised of bridge configuration registers 417 which are accesses by a host bus cycles targeted to the virtual configuration registers 497 of virtual secondary P—P bridge 490.

Similar to system 300, both the host bus device 410 and host-to-PCI bridge 340, in this embodiment, are aware of the bus number and device number in which primary virtual P—P bridge 370 resides. This information may be provided by an initialization program, hardwired or preprogrammed. Additionally, host bus device 410 includes monitor circuit 114, which, in this embodiment, may learn the bus numbers assigned to primary virtual PCI bus 357 and its subordinates by snooping host bus cycles targeted to the configuration registers 378 of primary virtual P—P bridge 370. This information acquired through snooping may be stored in storage 115. In a system 400 that consist of a single host bus device 410, the device number of the secondary virtual P—P bridge 490 may be assigned arbitrarily.

In a system with a multiple host bus devices 410, a mechanism is required to associate each host bus device with a distinct secondary virtual P—P bridge 490 such as assigning a unique device number for the associated secondary virtual P—P bridge 490 to each host bus device 410, which may be hardwired, preprogrammed, or assigned by an initialization program. Each host bus device 410 may consult its internal configuration registers 417, after it is written by a computer program, to determine the bus number assigned to the secondary virtual bus 451 that directly behinds its associated secondary virtual P—P bridge and then arbitrarily assign a device number to each one or more virtual PCI devices 460. This information may be consulted by monitor circuit 114 to identify of host bus cycles targeted to the virtual PCI device 160 in a similar manner as described for system 100. Each host bus device 410 may include multiple physical devices which are each associated with a distinct virtual device 160 logically residing on its associated secondary virtual PCI bus 451. Plug and Play™ programs typically group resources assigned to all virtual devices 160 residing behind each secondary virtual P—P bridge 490 resulting in easy decode of host bus cycles by each host bus device 410 for identifying cycles to be intercepted. For example, a single memory address range may be allocated to the secondary virtual P—P bridge 490 that encompasses the multiple ranges allocated to each device.

Figure 5:
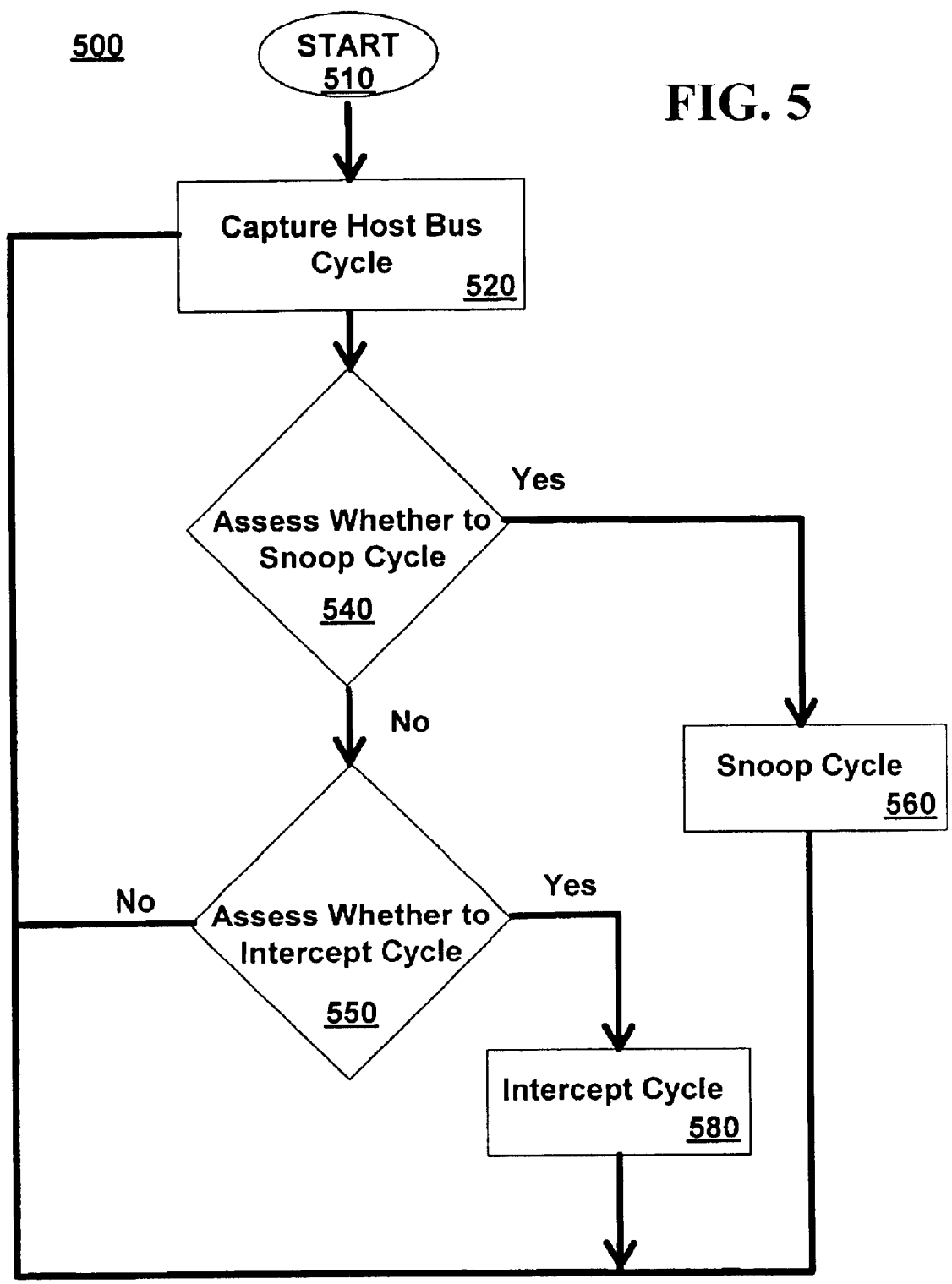
FIGS. 5, 6A, 6B show flow charts of method embodiments.

FIG. 5 shows a flow diagram for explaining a method 500 of the present invention that may be utilized by systems 100, 200, 300, 400 and executed by monitor circuit 114. Start 510 may be a host bus reset, which will result in storage and registers being set to default values. The following steps may be executed for each host bus cycle. The step of capturing 520 involves waiting for a host bus cycle, then receiving and latching select host bus address and control signals that indicate the target for the current host bus cycle. The next step of assessing (step 540) includes evaluating each captured cycle to determine whether to enter intercept step 550 or to enter snooping step (step 560). Snooping (step 560) involves receiving and storing in storage 115 select host bus data signals 120. The step of assessing (step 550) includes evaluating each captured cycle to determine whether to do nothing for the current cycle and enter step 520 to capture the next host bus cycle or to enter intercept the cycle (step 580), which causes the current host bus cycle to be routed to access (i.e. read or write) the appropriate locations within host bus storage 111. Step 540 and 550 may be executed in parallel or either step 540,550 may precede the other.

Figure 6A:
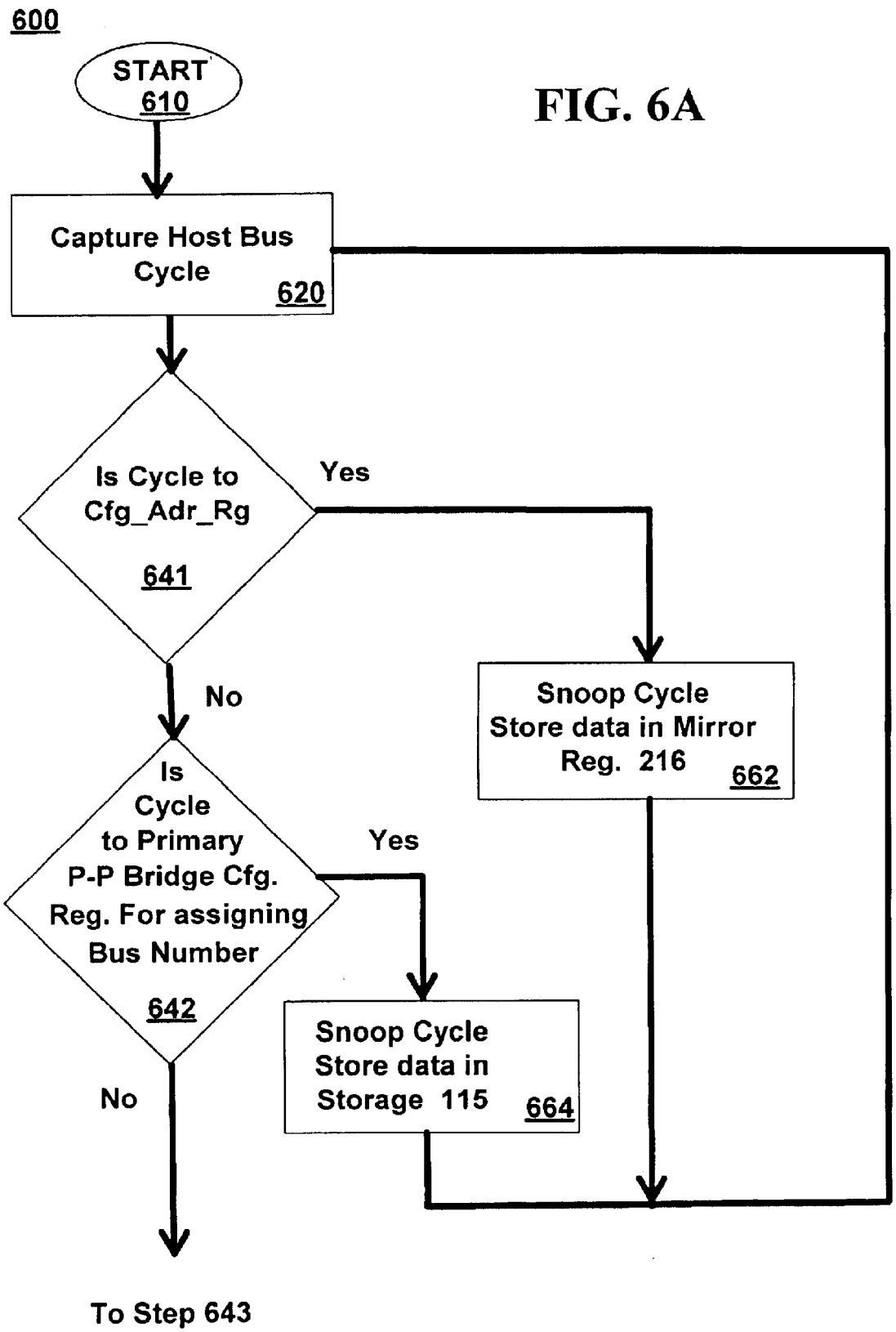
Figure 6B:
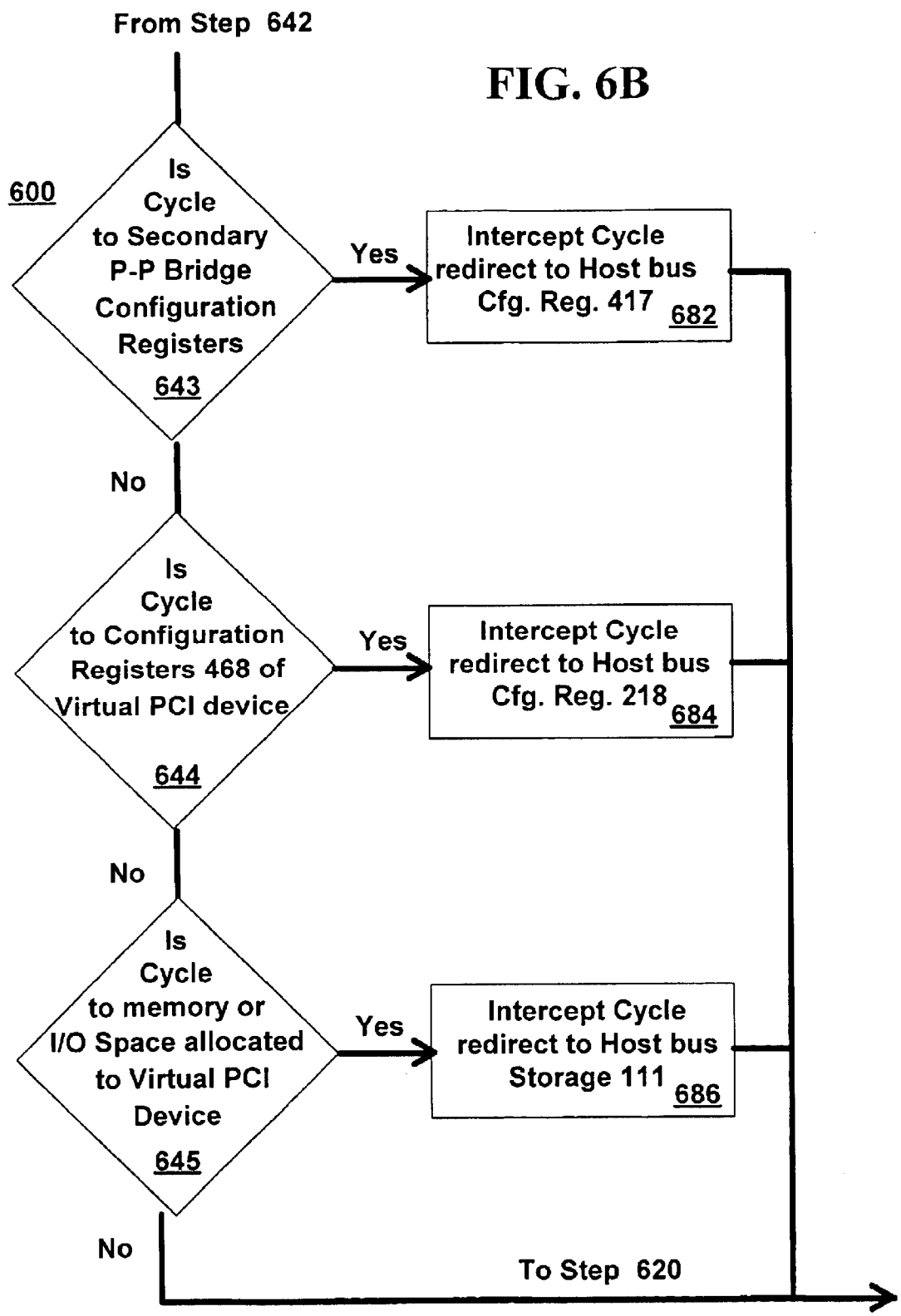

FIGS. 6A and 6B show flow diagrams for explaining a method 600 executed by monitor circuit 114 of system 400, which is shown in FIG. 4. Start (step 610) and capturing (step 620) may be the same as described for steps 510 and 520, respectively. Assessing (step 540) and snooping (step 560) are accomplished with steps 641, 642, 662 and 664. Likewise assessing step 550 and intercepting step 580 are accomplished with steps 643, 644, 645, 682, 684, and 686. Assessing steps 641–645 may take place substantially in parallel during the address phase of a host bus cycle, and if snooping step 662, 664 or intercepting step 682, 684, 686 is executed, then the snooping or intercepting step may take place during the data phase of a host bus cycle. Snooped cycles may be completed (e.g. terminated) by a device other than host bus device 410 and intercepted cycles may be completed by the host bus device 410.

Assessing step 641 includes an evaluation of whether the current captured host bus cycle is targeted to configuration-address register 243. A positive evaluation results in step 662 being entered and the data transferred by the current captured cycle is snooped and some or all of this data is stored in mirror register 216. A negative evaluation results in step 642 being entered.

Assessing step 642 includes an evaluation of whether the captured host bus cycle is targeted to the specific virtual configuration registers 378 for assigning a bus number to primary virtual P—P bridge 370. A positive evaluation requires configuration-address register 243 (as reflected by contents of mirror register 216) to have a value indicating that configuration space is enabled and a value that is currently pointing to the specific configuration register 378 of primary virtual P—P bridge 370 that specifies the bus number assigned to primary virtual bus 357. A positive evaluation also requires the captured read or write host bus cycle to be targeted to configuration-data register 244. A positive evaluation in step 642 results in snooping step 664 being entered where some or all host bus 120 data transferred in the current cycle being latched and stored in storage 115.

Assessing step 643 includes an evaluation of whether the current cycle is targeted to configuration space of a secondary P—P bridge 490. A positive evaluation requires configuration-address register 243 (as reflected by contents of mirror register 216) to have a value indicating that configuration space is enabled and has a value that is currently pointing to the configuration registers 497 of secondary P—P bridge 490. A positive evaluation also requires the captured cycle to be a read or write host bus cycle targeted to the configuration-data register 244. A positive evaluation in step 643 results in intercepting step 682 being entered to route the current host bus cycle to configuration registers 417 which are for secondary virtual P—P bridge 490, wherein the specific configuration registers 417 accessed are determined by the current contents of mirror register 216.

Assessing step 644 includes an evaluation of whether the captured host bus cycle is targeted to configuration space of a virtual PCI device 160. A positive evaluation requires configuration-address register 243 (as reflected by contents of mirror register 216) to have a value indicating that configuration space is enabled and a value that is currently pointing to the configuration registers 268 of virtual PCI device 160. A positive evaluation also requires the captured cycle to be a read or write host bus cycle targeted to the configuration-data register 244. A positive evaluation in step 644 results in intercepting step 684 being entered to route the current host bus cycle to access the particular host bus configuration register 218 as indicated by the contents of mirror register 216.

Assessing step 645 includes the evaluation of whether the captured host bus cycle is targeted to memory or I/O address space allocated by a computer program to virtual PCI device 160. If the specific configuration registers 218 that specify memory or I/O space allocated to virtual PCI device 460 have not been previously set, then the results of this evaluation is always negative. The address space allocated to virtual PCI device 160, as determined by the current contents of PCI configuration registers 218, are compared to the captured host bus cycle information. If the target for current host bus cycle is within the address space allocated to virtual PCI device 160, then step 686 is entered to route the current host bus 420 cycle to the appropriate internal storage 111 as indicated by the address and control signals of the captured host bus cycle.

One skilled in the art will appreciate that functions described herein may be implemented in other physical devices than described while keeping with the sprit of the invention.

Although the present invention is described as being applied to PCI systems, one skilled in the art will appreciate that the methods taught herein may be utilized by any system having a host bus and a peripheral bus (similar to a PCI compliant bus) where advantage is obtained by having a device on coupled to the host bus appear, to computer programs running on a processor in the system, as a residing on a peripheral bus.

What is claimed is:

1. An apparatus, comprising:
   an interface for directly coupling to a host bus having one or more processors without being shared with a host-to-PCI bridge;
   a device coupled to the interface to perform one or more functions, said device appearing as a virtual PCI device, logically residing on a PCI bus that is coupled to the host bus through the host-to-PCI bridge, wherein access by the device to the host-to-PCI bridge is only through the host bus; and
   a monitor circuit coupled to said interface and said device to track host bus cycles initiated by at least one of the processors coupled to the host bus, to identify processor initiated host bus cycles targeted to the virtual PCI device, and to generate one or more control signals to enable the device to respond, as the virtual PCI device, to said one or more of said identified host bus cycles targeted to said virtual PCI device without having to access the host-to-PCI bridge.

2. The apparatus of claim 1, further comprising a first storage coupled to the interface and the monitor circuit to store data associated with host bus read cycles addressed to the virtual PCI device, wherein the data is transferred from the first storage to the host bus during the host bus read cycles without accessing a host interface of the host-to-PCI bridge.

3. The apparatus of claim 2, further comprising a second storage coupled to the interface and the monitor circuit to store data associated with host bus write cycles addressed to the virtual PCI device, wherein the data is transferred from the host bus to the second storage during the host bus write cycles without accessing the host interface of the host-to-PCI bridge.

4. The apparatus of claim 1, further comprising a processor coupled to the interface, the processor capable of initiating one or more host bus cycles on the host bus via the interface.

5. The apparatus of claim 3, further comprising an internal bus to connect the device, the monitor circuit, and the first and second storages to the interface.

6. The apparatus of claim 1, wherein the device is a bridge device coupled to one or more other devices and the device appears as a virtual PCI–PCI bridge logically residing on a PCI bus coupling to the host-to-PCI bridge.

7. The apparatus of claim 1, wherein said identified host bus cycles targeted to said virtual PCI device include host bus cycles targeted to memory address space allocated to said virtual PCI device.

8. The apparatus of claim 1, further comprising a mirror register coupled to said host bus and responsive to one or more of said control signals to receive data from said host bus;
wherein said monitor circuit is to further identify host bus write cycles targeted to a configuration-address register; and
wherein said monitor circuit is to generate said control signals to receive data from said host bus to store in said mirror register during said host bus cycles identified as targeted to said configuration-address register.

9. The apparatus of claim 1, wherein said identified host bus cycles targeted to said virtual PCI device include host bus cycles to I/O address space allocated to said virtual PCI device.

10. The apparatus of claim 2, wherein said first storage includes a first plurality of configuration registers; and
wherein said identified host bus cycles include host bus cycles targeted to configuration space reserved for said virtual PCI device.

11. The apparatus of claim 10, wherein said virtual PCI device resides behind a virtual PCI-to-PCI bridge, wherein said first storage includes a second plurality of configuration registers, and wherein said monitor circuit is to further identify host bus cycles targeted to configuration space allocated to said virtual PCI-to-PCI bridge, and wherein said monitor circuit is to generate said plurality of control signals to transfer one or more said data to said host bus during one or more of said identified host bus read cycles targeted to said configuration space allocated to said virtual PCI-to-PCI bridge.

12. An apparatus, comprising:
an interface for directly coupling to a host bus without being shared with a host-to-PCI bridge;
a first storage, wherein contents of said first storage specify a first address space allocated to a primary PCI bus;
a device coupled to the interface to perform one or more functions, the device appearing as a virtual PCI device, logically residing on a PCI bus coupled to the primary PCI bus, wherein access by the device to the host-to-PCI bridge is only through the host bus;
a second storage, wherein contents of said second storage specify a second address space allocated to said virtual PCI device; and
a control circuit, coupled to said first and said second storage, wherein said control circuit is to couple to a host bus to track processor initiated host bus cycles and to select host bus cycles to route to said primary PCI bus, wherein said routed cycles are to be selected, based on said contents of said first storage and said second storage, to exclude host bus cycles targeted to said second address space.

13. The apparatus of claim 12, wherein said first and said second address space includes memory host bus address space.

14. The apparatus of claim 12, wherein said first and said second address space includes host bus I/O space.

15. The apparatus of claim 12, wherein said first and said second address space includes PCI compliant configuration address space.

16. The apparatus of claim 12, wherein said virtual PCI device is a virtual PCI-to-PCI bridge.

17. The apparatus of claim 16, further comprising:
a plurality of configuration registers;
a third storage coupled to said control circuit, wherein contents of said third storage indicate a bus and a device number in which said virtual PCI-to-PCI bridge logically resides, and wherein said control circuit is to further select, based on said bus and said device number, host bus cycles, targeted to configuration address space of said virtual PCI-to-PCI bridge, to route to said plurality of configuration registers without having to access a host interface of the host-to-PCI bridge.

18. A system comprising:
one or more processors coupled to a host bus;
a host-to-PCI bridge coupling a primary PCI bus to the host bus, said host-to-PCI bridge to route processor initiated host bus cycles to the primary PCI bus; and
a first host bus device coupled to said host bus and appearing as a first virtual PCI device logically residing on a PCI bus coupled to the primary PCI bus, to monitor said host bus, to identify processor initiated host bus cycles targeted to said first virtual PCI device, and to intercept said identified cycles targeted to said first virtual PCI device without accessing the host-to-PCI bridge, wherein access by the device to the host-to-PCI bridge is only through the host bus;
wherein said host-to-PCI bridge does not forward said identified cycles to the PCI bus coupled via the host-to-PCI bridge, which are targeted to said first virtual PCI device.

19. The system of claim 18, wherein said first host bus device includes a plurality of configuration registers, wherein said intercepted cycles, include host bus cycles targeted to configuration space reserved for said first virtual PCI device and are to be routed to access said plurality of configuration registers.

20. The system of claim 18, wherein said first host bus device includes an array of memory devices, wherein said intercepted cycles include host bus cycles targeted to a memory space allocated to said first virtual PCI device and are to be routed to access said array of memory devices.

21. The system of claim 18, further comprising a second host bus device coupled to said host bus, the second host bus device appearing as a second virtual PCI device logically residing on a PCI bus coupled to the primary PCI bus, and the first and second virtual PCI devices having a unique combination of a PCI bus number and device number.

22. The system of claim 18, wherein said first virtual PCI device resides logically behind a primary virtual PCI-to PCI bridge, wherein said primary virtual PCI-to-PCI bridge resides logically behind said primary PCI bus, and wherein said first host bus device is to snoop said host bus to determine a bus number assigned to said primary virtual PCI-to PCI bus.

23. The system of claim 22, wherein said first virtual PCI device resides logically behind a secondary virtual PCI-to PCI bridge which resides logically behind said primary virtual PCI-to-PCI bridge, wherein said first host bus device includes a plurality of bridge configuration registers, and wherein said intercepted cycles include host bus cycles targeted to the configuration space reserved for said secondary virtual PCI-to PCI bridge and are to be routed to access said plurality of bridge configuration registers.

24. A method comprising:

capturing a current host bus cycle initiated by a processor coupled to a host bus;

determining whether said captured cycle is targeted to a virtual PCI device residing logically at a PCI bus behind a primary PCI bus, the virtual PCI device representing a host bus device directly coupled to the host bus without having to share an interface with a host-to-PCI bridge and without having to access a host interface of the host-to-PCI bridge in order to access the host bus;

intercepting said current host bus cycle, if said current cycle is determined to be targeted to said virtual PCI device, without routing said cycle to said primary PCI bus via the host interface of the host-to-PCI bridge; and routing the intercepted host bus cycle to the host bus device without using the host interface of the host-to-PCI bridge to enable the host bus device to respond, as said virtual PCI device, to the host bus cycle.

25. The method of claim 24, wherein said intercepting includes routing to access a storage coupled to said host bus.

26. The method of claim 24, wherein said intercepting includes routing to access a location within a plurality of configuration registers.

27. The method of claim 24, wherein said determining includes determining whether said current cycle is a write cycle targeted to a configuration-address register and snooping said current host bus cycle to receive data from said host bus if said current cycle is a write cycle targeted to said configuration-address register and writing some or all of said data into a mirror register.

28. The methods of claim 24, wherein said determining includes determining whether said current cycle is a write cycle targeted to a location within the configuration registers of a virtual primary PCI-to-PCI bridge in which a bus number is specified; and snooping said current host bus cycle to receive data from said host bus if the current cycle is a write cycle to a location within the configuration registers of a virtual primary PCI-to-PCI bridge in which a bus number is specified and writing said data in a storage.

29. The method of claim 24, wherein said determining includes determining whether said cycle is to a location within the configuration registers of a virtual PCI-to-PCI bridge; and intercepting said current host bus to route to access a location within a plurality of bridge configuration registers if said cycle is to a location within the configuration registers of a virtual PCI-to-PCI bridge.

30. The method of claim 24 wherein said virtual PCI device is a virtual PCI-to-PCI bridge.

* * * * *